US012065335B2

(12) United States Patent
Moritz Urban

(10) Patent No.: US 12,065,335 B2
(45) Date of Patent: Aug. 20, 2024

(54) VEHICLE CRANE WITH A BOOM THAT CAN BE LUFFED BY TWO LUFFING CYLINDERS

(71) Applicant: Tadano Demag GmbH, Zweibrücken (DE)

(72) Inventor: Christian Moritz Urban, Zweibrücken (DE)

(73) Assignee: Tadano Demag GmbH, Zweibrücken (DE)

( * ) Notice: Subject to any disclaimer, the term of this patent is extended or adjusted under 35 U.S.C. 154(b) by 504 days.

(21) Appl. No.: 17/416,077

(22) PCT Filed: Dec. 17, 2019

(86) PCT No.: PCT/EP2019/085718

§ 371 (c)(1),
(2) Date: Jun. 18, 2021

(87) PCT Pub. No.: WO2020/127318

PCT Pub. Date: Jun. 25, 2020

(65) Prior Publication Data

US 2022/0073321 A1 Mar. 10, 2022

(30) Foreign Application Priority Data

Dec. 21, 2018 (DE) ......................... 102018133493.1

(51) Int. Cl.
*B66C 23/42* (2006.01)
*B66C 23/82* (2006.01)
*B66F 9/065* (2006.01)

(52) U.S. Cl.
CPC .............. *B66C 23/42* (2013.01); *B66C 23/82* (2013.01); *B66F 9/0655* (2013.01)

(58) Field of Classification Search
CPC . B66C 23/821; B66C 23/826; B66C 2700/06; B66C 23/42; B66C 23/62;
(Continued)

(56) References Cited

U.S. PATENT DOCUMENTS 2,601,927 A * 7/1952 Frenzel .................... B66C 13/18 212/289
2,996,196 A * 8/1961 Podlesak ................. B66C 13/18 212/231
(Continued)

FOREIGN PATENT DOCUMENTS

DE 202005015044 U1 12/2005
GB 843024 A 8/1960
(Continued)

OTHER PUBLICATIONS

International Search Report of the International Searching Authority from corresponding Patent Cooperation Treaty (PCT) Application No. PCT/EP2019/085718, indicated completed on Apr. 9, 2020.
(Continued)

*Primary Examiner* — Sang K Kim
*Assistant Examiner* — Nathaniel L Adams
(74) *Attorney, Agent, or Firm* — Gardner, Linn, Burkhart & Ondersma LLP

(57) ABSTRACT

A vehicle crane having a boom that can be luffed between a storage position and a working position within a vertical luffing plane by at least two luffing cylinders The luffing cylinders that lie opposite one another on the luffing plane, enclosing a spread angle between their longitudinal axes in the working position, and the luffing cylinders acting on the boom outside its ends. The longitudinal axis, projected onto the luffing plane, of one luffing cylinder and a vertical direction extending within the luffing plane enclose an angle of inclination there between when the boom is in the storage position to achieve a compact design, particularly when the boom is in the storage position.

15 Claims, 7 Drawing Sheets

(58) Field of Classification Search
CPC ......... B66C 23/82; B66C 23/86; B66F 9/065; B66F 9/0655
See application file for complete search history.

(56) References Cited

U.S. PATENT DOCUMENTS

| | | | | | |
|---|---|---|---|---|---|
| 3,045,836 | A | | 7/1962 | Percy | |
| 3,722,706 | A | * | 3/1973 | Blonsky | B66C 3/16 294/198 |
| 3,792,778 | A | | 2/1974 | Sholl et al. | |
| 3,842,983 | A | * | 10/1974 | Dolza | B66C 23/54 212/258 |
| 4,304,519 | A | * | 12/1981 | Hubbard | B60P 3/125 414/547 |
| 6,089,388 | A | | 7/2000 | Wilim | |

FOREIGN PATENT DOCUMENTS

| | | | | | |
|---|---|---|---|---|---|
| WO | 0114239 | A1 | | 3/2001 | |
| WO | WO-2011128510 | A1 | * | 10/2011 | B66C 23/42 |
| WO | 2019172824 | A1 | | 9/2019 | |

OTHER PUBLICATIONS

International Written Opinion of the International Searching Authority from corresponding Patent Cooperation Treaty (PCT) Application No. PCT/EP2019/085718, indicated completed on Apr. 9, 2020.
International Preliminary Report on Patentability from corresponding Patent Cooperation Treaty (PCT) Application No. PCT/EP2019/085718, indicated completed on Aug. 19, 2020.
Preliminary Report on Patentability of the International Searching Authority in English from corresponding Patent Cooperation Treaty (PCT) Application No. PCT/EP2019/085718, completed Apr. 21, 2021.

* cited by examiner

VEHICLE CRANE WITH A BOOM THAT CAN BE LUFFED BY TWO LUFFING CYLINDERS

CROSS REFERENCE TO RELATED APPLICATION

The present application claims the priority benefits of International Patent Application No. PCT/EP2019/085718, filed Dec. 17, 2019, and claims benefit of German patent application no. DE 10 2018 133 493.1, filed on Dec. 21, 2018.

BACKGROUND OF THE INVENTION

The invention relates to a vehicle crane assembly comprising a jib which can be luffed via at least two luffing cylinders within a vertical luffing plane between a storage position and an operating position, wherein the luffing cylinders lying opposite one another on the luffing plane form, in the operating position, an angle of spread between their longitudinal axes, and the luffing cylinders act upon the jib outside its ends. The invention also relates to a vehicle crane comprising such an assembly.

The performance capability of mobile vehicle cranes which is required in use is determined definitively by their respective jib. Its mostly luffable and telescopic arrangement on a rotatable superstructure opens up correspondingly large working spaces, within which the required displacement of loads can be effected. The vertical orientation of the jib, which extends substantially horizontally during travel, between its storage position and an operating position which is raised with respect thereto is effected via at least one luffing cylinder which can be varied in length.

British laid-open document GB 843,024 A discloses a vehicle crane comprising a jib which has a total of two luffing cylinders which operate independently of one another. The vehicle crane has a lower carriage, on which the jib is supported in an articulated manner via its lower end. The luffing cylinders which extend between the jib and the lower carriage are connected to a region of the jib in an articulated manner via their upper ends. The lower ends of the luffing cylinders are supported in an articulated manner on the lower carriage at a distance from one another such that their longitudinal axes form an angle of spread therebetween. The ability to actuate the two luffing cylinders separately from one another makes it possible to pivot the jib within a vertical luffing plane and also to a limited extent horizontally relative to the lower carriage.

The position of the two luffing cylinders splayed in an A shape with respect to one another is based upon the desire for an option to orient the jib relative to the lower carriage of the vehicle crane beyond the vertical pivoting capability. In addition to the thus only limited lateral pivoting capability of the jib, the design of the jib means that it stands in its storage position on the two luffing cylinders which are oriented perpendicularly in projection onto the luffing plane, which opposes the advantage of the most compact possible vehicle dimensions particularly during travel. In view of these observations, there is still room for the known assembly to be improved.

Patent document U.S. Pat. No. 2,996,196 discloses a further vehicle crane comprising a main jib and a luffing jib. In this case, the main jib consists of two main jib arms which are mounted together on an upper end of a main jib head and extend from here in a v-shape in the direction of the vehicle. The two main jib arms are each mounted with their lower ends on the vehicle so as to be luffable about horizontal axes. The main jib arms are each telescopic in opposite directions in order to be able to incline the main jib laterally to the right or left. For the purpose of luffing the two main jib arms, a single telescopic luffing jib is provided which is fastened likewise in an articulated manner to the main jib head and to a pivot frame on the vehicle. Therefore, starting from the main jib head, the two main jib arms and the luffing jib form a tripod. In conjunction with the luffing procedure of the two main jib arms, they are subjected to compressive loading and the luffing jib is subjected to tensile loading. The u-shaped pivot frame is mounted, in turn, in an articulated manner in the region of the horizontal axes of the main jib arms on the vehicle. Moreover, the pivot frame can be pivoted via a hydraulic cylinder, which is also supported on the vehicle, from a raised operating position to a substantially horizontal transport position. Together with the pivot frame, the two main jib arms with the luffing jib are thus also pivoted by the further hydraulic cylinder from the operating position to the transport position.

Furthermore, utility model document DE 20 2005 015 044 U1 already describes a vehicle crane comprising a lower carriage which can travel on roads and on which a superstructure, which is pivotable about a vertical pivot axis, is mounted. A telescoping jib comprising a basic box and a plurality of inner boxes which can telescope therefrom is mounted on the superstructure so as to be luffable about a horizontal axis. The telescoping cylinder is luffed up and down via two hydraulic luffing cylinders which are arranged in parallel and at a spaced interval from one another and are supported at their lower end on the superstructure and are articulated with their upper ends approximately in the region of the centre and on the lower side of the basic box of the telescoping jib.

SUMMARY OF THE INVENTION

The present invention provides an improved assembly and a thus equipped vehicle crane comprising luffable jibs such that it is possible to achieve a compact design in particular when the jib is in the storage position.

Accordingly, an embodiment of the invention proposes that in the case of a vehicle crane comprising a jib which can be luffed via at least two luffing cylinders within a vertical luffing plane between a storage position and an operating position, wherein the luffing cylinders lying opposite one another on the luffing plane form, in the operating position, an angle of spread between their longitudinal axes, and the luffing cylinders act upon the jib outside its ends, wherein, when the jib is in the preferably horizontal storage position, the longitudinal axis of a luffing cylinder projected onto the luffing plane and an upwards direction or vertical direction extending within the luffing plane form an angle of inclination therebetween. In other words, in a side view of the jib, the two luffing cylinders are thus inclined with respect to the vertical upwards direction once the jib is located in its storage position.

In conjunction with aspects of the present invention, the feature in relation to the luffing cylinders which act upon the jib outside its ends is understood to mean that the luffing cylinders act upon a region on the jib or the basic box which, as seen in the longitudinal direction of the jib or a basic box of the jib, is spaced apart at least 10%, preferably at least 20%, particularly preferably at least 30%, of the total length of the jib or the basic box in each case from the upper end and also the lower end of the jib or basic box. On the whole, the luffing cylinders are thus more likely to act centrally upon the jib or the basic box than on the head end thereof.

The resulting advantage is based on the fact that the jib which is supported via the luffing cylinders is now no longer raised as previously over its entire component length which remains in the retracted state, once it is located in its storage position. With respect to the orientation of the luffing cylinders which in the storage position hitherto extended perpendicular or parallel to the upwards direction, in particular in the now possible, approximately or precisely horizontal orientation capability of the luffing cylinders, considerably less installation space is now required below the jib located in the storage position in order to be able to accommodate the luffing cylinders. In accordance with the invention, the orientation of each individual luffing cylinder, which is now always inclined with respect to the upwards direction when the jib is in the storage position, ensures that the positions of its end-side connections, which hitherto lay one above the other, are offset with respect to one another by reason of the horizontal and vertical component resulting from the inclination. Since the upper end-side connection of each individual luffing cylinder is pivoted on a circular path about its lower end-side connection, the jib can be oriented correspondingly lower in its storage position.

According to a preferred development of the basic inventive concept, when the jib is in the storage position, the angle of inclination of the luffing cylinders with respect to the upwards direction can be from 600 to 120°. Therefore, it is possible that, when the jib is in the storage position, each luffing cylinder can extend not only up to +30° above a horizontal but also up to −30° therebelow. Depending upon the arrangement of the lower end-side connections of the luffing cylinders and the pivotable mounting, the jib when in its storage position can likewise extend in relation to the horizontal in an inclined manner upwards or downwards and in parallel therewith.

Depending upon the configuration, it is considered to be advantageous if, when the jib is in the storage position, the luffing cylinders can extend almost in parallel with the horizontal, wherein the angle of inclination thereof with respect to the upwards direction can then preferably be from 80° to 100° or from 90° to 97°.

An aspect of the invention makes provision that the assembly can comprise a base frame, on which the jib is luffably mounted with its lower end. In order to obtain the most stable possible and self-contained assembly, it is considered to be particularly advantageous if the luffing cylinders are likewise supported in an articulated manner on the base frame. For this purpose, it is advantageously possible to provide lower mounting assemblies which are designed e.g. in each case as a universal joint or ball joint and via which the luffing cylinders are correspondingly connected to the base frame.

As an alternative or in addition thereto, the jib which is luffably mounted on a base frame can comprise upper mounting assemblies which are then allocated in each case to an upper end of one of the two luffing cylinders. In this manner, the luffing cylinders are also supported at their upper ends in an articulated manner on the jib via the upper mounting assemblies. Preferably, the upper mounting assemblies can be designed as a universal joint or ball joint.

According to a particular embodiment of the invention, at least one of the previously discussed mounting assemblies can be movable relative to the base frame or to the jib in order, as required, to be positioned in a variable manner along an associated path extending perpendicularly to the luffing plane. For this purpose, said path can have a linear or curved course at least in sections. The resulting displaceability of at least one of the two lower mounting assemblies and/or upper mounting assemblies permits a corresponding change in the angle of spread between the luffing cylinders, whereby the angle of spread formed therebetween can be opened accordingly downwards (A-shape) or upwards (V-shape). In other words, from a frontal view the two luffing cylinders can have an A-shape or a V-shape with one another. In the case of said V-shape, the upper ends of the luffing cylinders on the jib are further apart from one another in the orthogonal direction with respect to the luffing plane than their opposite lower ends on the base frame. For the A-shape, the foregoing applies accordingly in reverse. The V-shape permits a more compact design close to the lower mounting assemblies of the luffing cylinders.

By means of the displaceability of the lower and/or upper mounting assemblies, the effect which results from the A-shaped or V-shaped position and which stabilises the jib in particular in its A-shape with respect to lateral influences can be e.g. advantageously increased as required. Irrespective thereof, the displacement of the mounting assembly of at least one luffing cylinder once again permits, as required, more compact dimensions of the assembly in accordance with the invention. Thus, when the jib is preferably in the storage position the at least one mounting assembly can be displaced closer towards said jib in order accordingly to decrease the lateral dimensions of the assembly at least temporarily. The angle of spread which decreases at the same time can reduce the lateral stability of the jib, which in any case is irrelevant particularly when it is in its storage position.

Furthermore, with the aid of the displacement and/or rotation options it is also possible to change the mounting position of the luffing cylinders relative to a pivot joint which supports the jib on the base frame. As a result, it is possible to vary the respective triangle which includes the ends of the luffing cylinders on the base frame and on the jib as well as the pivot joint of the jib on the base frame. The displacements thus possible permit an improved force flow such that the components on the luffing cylinder, base frame and jib can be optimised.

In a further development of the displaceability specified above, it is considered to be particularly advantageous if the lower and/or upper mounting assemblies of the luffing cylinders can be displaced simultaneously in respectively opposite directions in a corresponding manner towards one another or away from one another along the associated path. As a result, the inclination of the two luffing cylinders can be changed to the same extent and so their connection to the jib always remains within the luffing plane while the angle of spread between the longitudinal axes of the luffing cylinders is changed. Therefore, undesired transverse displacement of the jib during displacement of the mounting assembly/assemblies can be effectively prevented.

Preferably, the assembly in accordance with the invention can be configured in such a manner that, when the jib is not only in the storage position but also in an adopted operating position, the lateral stabilisation thereof can be increased as required, in that at least one of the two lower and/or upper mounting assemblies of the luffing cylinders can be displaced accordingly in opposite directions. On the whole, it is considered to be advantageous if the angle of spread between the longitudinal axes of the two luffing cylinders can be changed when the jib is in the storage position and/or operating position.

In this regard, the angle of spread which is open at the bottom or top can be from greater than 0° to 45° when the jib is in the operating position. In particular, the angle of spread which is open at the bottom or top can be from 2° to 30° when the jib is in the operating position. In contrast, the value of the angle of spread which is open at the bottom or top can be in a particularly preferred manner from 0° to 45° or from 0° to 6° when the jib is in the storage position, such that an at least approximately parallel orientation of the luffing cylinders is permitted e.g. during travel of a vehicle crane which is equipped with the assembly in accordance with the invention.

Even if the base frame can be a component which can be connected e.g. to a region of a vehicle crane, it is considered to be advantageous if the base frame itself is a part of a superstructure of a vehicle crane which can be rotated with respect to a lower carriage. Of course, the base frame itself can be a superstructure or can be designed as a superstructure. As an alternative thereto, the base frame itself can be a part of a lower carriage of a vehicle crane. Of course, it is also the case in this respect that the base frame itself can be such a lower carriage or can be configured as a lower carriage.

By means of the assembly in accordance with the invention now presented, it is possible to achieve an overall compact design in particular when the jib of said assembly is in the storage position. This is made possible by the orientation of the luffing cylinders which is inclined when the jib is in the storage position. In combination with the displaceable mounting assemblies, the lateral stability of the jib which is already provided by reason of the A-shaped orientation of the luffing cylinders with respect to one another can be increased once again, which can have an occasionally significant influence on the configuration of the pivotable mounting of the jib. Typically, this is to be designed in combination with luffing cylinders which are generally oriented in parallel with one another such that it can alone absorb the lateral forces acting upon the jib located in particular in the operating position and can transfer said lateral forces e.g. to a vehicle crane equipped therewith. By reason of the A-shaped or V-shaped orientation of the two luffing cylinders when the jib is at least in the operating position, producing a—statically viewed—advantageous and overall stable triangle, in particular in the A-shape, the forces acting laterally upon the jib can now be at least partially absorbed and transferred via the luffing cylinders, which significantly simplifies the requirement of the pivotable mounting of the jib and the base frame itself in terms of their ability to absorb such forces. As a result, said pivotable structural mounting of the jib and of the base frame can be e.g. correspondingly more advantageous and more slender.

In a preferred embodiment, provision is made that the jib is a telescoping jib having a basic box and inner boxes which can telescope in and out. Then, the luffing cylinders act upon the basic box of the jib.

In a particular embodiment, precisely two luffing cylinders are provided.

Furthermore, the vehicle crane comprises a lower carriage.

In a particularly advantageous manner, in particular in one embodiment of the vehicle crane comprising a lower carriage which has rubber tires and can travel on roads, provision is made that, when the jib is in the storage position, the jib is supported on the lower carriage.

An exemplified embodiment of the invention will be explained in greater detail with reference to the following description.

DETAILED DESCRIPTION OF THE PREFERRED EMBODIMENTS

Figure 1:
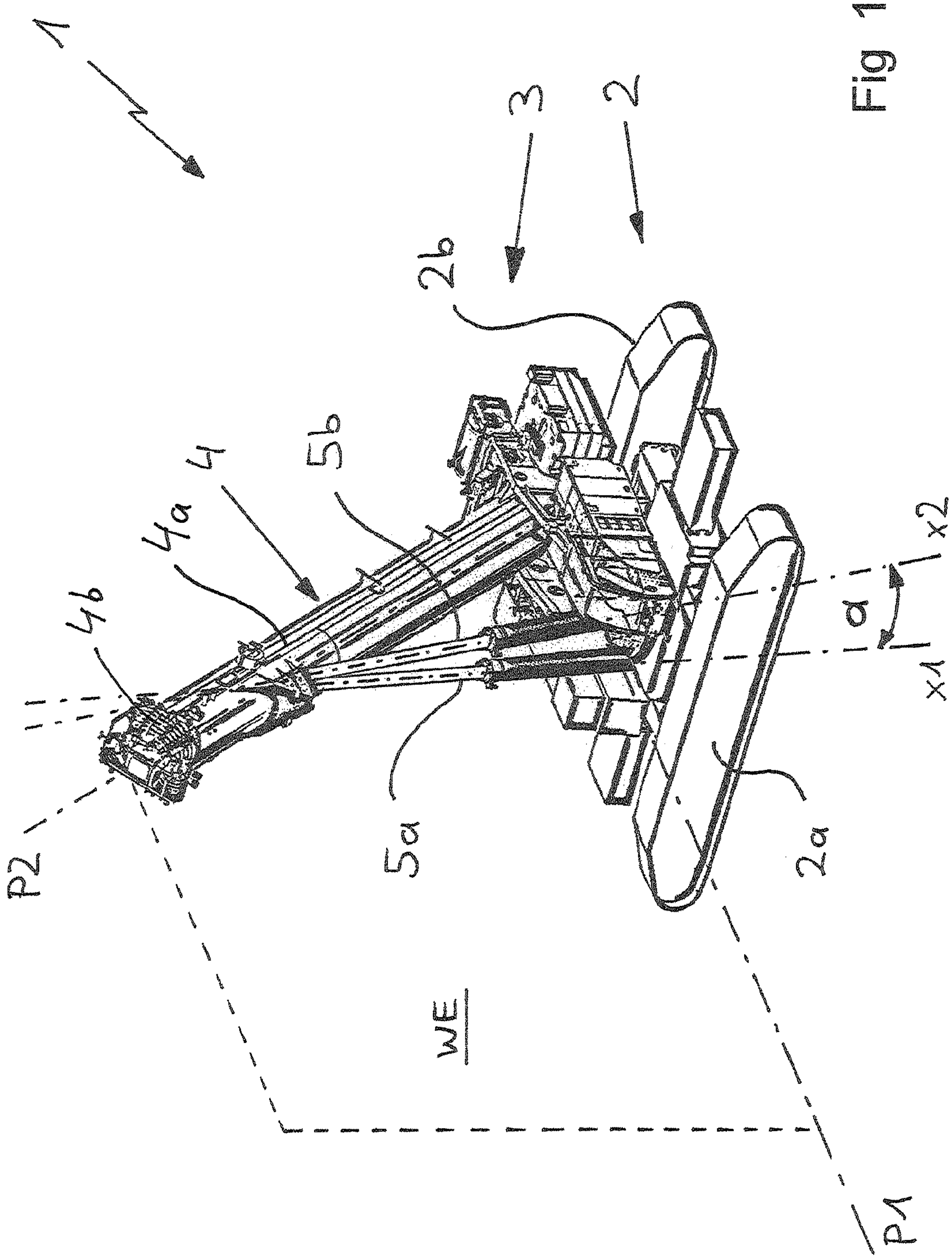
FIG. 1 schematically shows a vehicle crane in accordance with the invention in a perspective view.

FIG. 1 shows a vehicle crane 1 in accordance with the invention. For example, it is a vehicle crane 1 comprising a chain drive which has a lower carriage 2 equipped with two crawler tracks 2*a*, 2*b* spaced apart from each other in parallel. Of course, e.g. a lower carriage, not shown in greater detail here, which has tyres could also be used. A superstructure 3 comprising a driver's cabin 3*a* and a jib 4 is arranged in a rotatable manner on the lower carriage 2. Typically, the jib 4 is configured as a telescoping jib which consists of an outer basic box 4*a* and inner boxes 4*b* which can telescope hydraulically into and out of said basic box. The jib 4 is pivotably mounted via its lower end on the superstructure 3 such that it can be luffed between a horizontal storage position P1, which is only indicated in this case, to the operating position P2 which is shown in this case and is raised with respect thereto. The inclination of the jib 4 relative to the horizontal in the operating position P2 shown in this case is to be considered as an example because it can of course also assume all other values deviating from the orientation of the jib 4 in its storage position P1.

The jib 4 can be luffed exclusively within a vertical luffing plane WE, the orientation of which can be changed as required in a manner not shown in greater detail by the possibility of rotating the superstructure 3 relative to the lower carriage 2. The driving required for luffing and supporting the jib 4 is effected via two, preferably precisely two, luffing cylinders 5*a*, 5*b* lying opposite one another on the luffing plane WE. It is apparent that the two luffing cylinders 5*a*, 5*b* are arranged with respect to one another such that, when the jib 4 is in the operating position P2 illustrated in this case, their longitudinal axes x1, x2 form therebetween an angle of spread a which is open at the bottom. Moreover, the luffing cylinders 5*a*, 5*b* act upon the jib 4 outside its ends.

Figure 2:
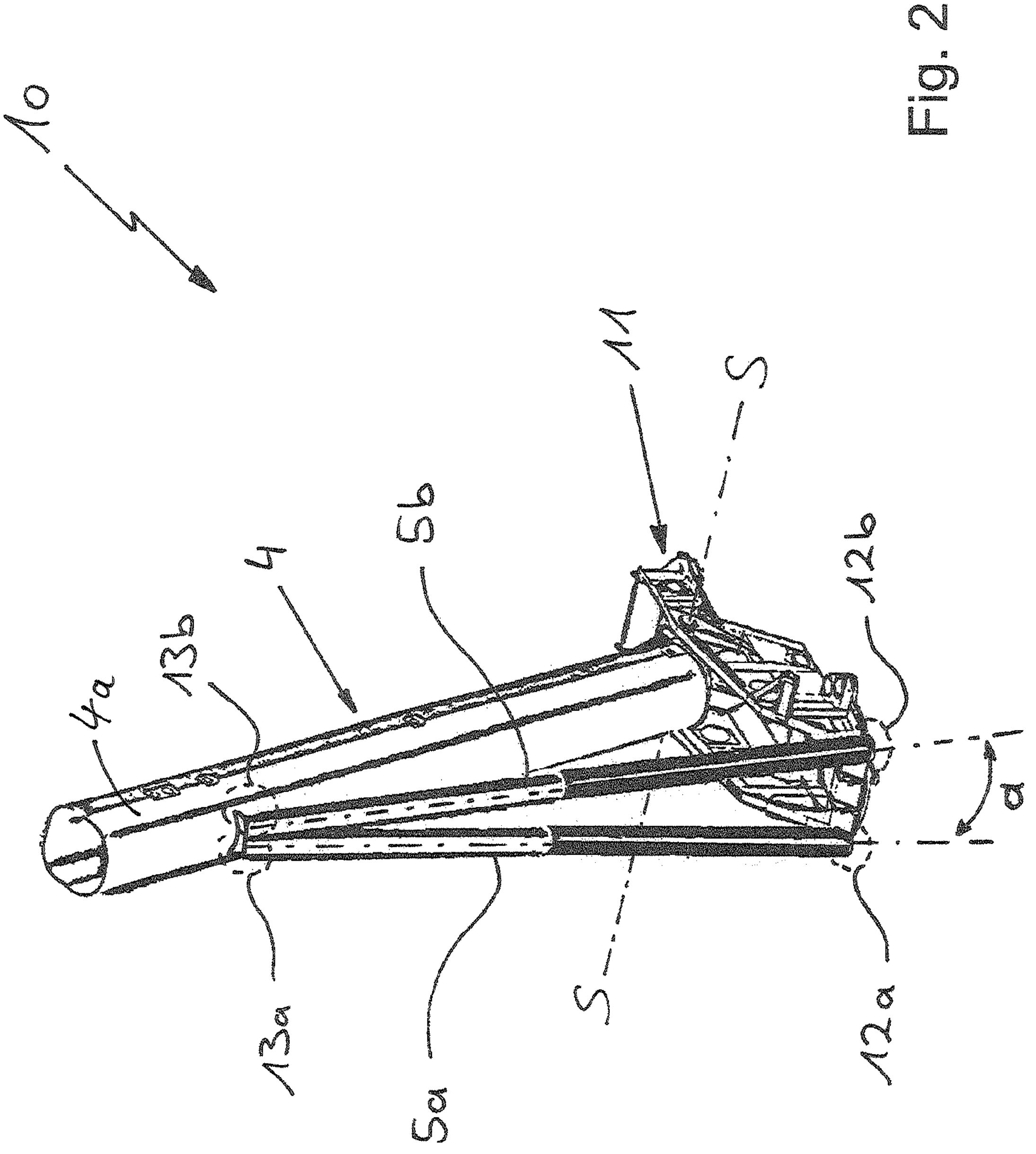
FIG. 2 schematically shows an inventive assembly of the vehicle crane of FIG. 1 in a perspective view.

FIG. 2 shows an assembly 10 in accordance with the invention which comprises some of the parts of the vehicle crane 1 which are already shown in FIG. 1. Specifically, the assembly 10 has the jib 4 which in the present case is reduced to its basic box only for reasons of clarity, as well as the two luffing cylinders 5*a*, 5*b* which are all supported via their lower ends on a base frame 11 of the assembly 10. The jib 4 is mounted on the base frame 11 so as to be able to be luffed about a horizontal pivot axis S, wherein the two luffing cylinders 5*a*, 5*b* are supported in an articulated manner on the base frame 11. For this purpose, in the present case two indicated mounting assemblies 12*a*, 12*b* are provided on the base frame 11 and two indicated upper mounting assemblies 13*a* and 13*b* are provided on the jib 4, which are each arranged on the two luffing cylinders 5*a*, 5*b*. Each of these mounting assemblies 12*a*, 12*b*; 13*a*, 13*b* is designed, in a manner not shown in greater detail, as a universal joint or ball joint in order to allow the two luffing cylinders 5*a*, 5*b* the freedom of movement required during luffing of the jib 4.

Moreover, in relation to the luffing cylinders 5*a*, 5*b* it is apparent from FIG. 1 that the luffing cylinders 5*a*, 5*b* which are designed as hydraulic cylinders are articulated, preferably with the upper ends of their piston rods, to the basic box 4*a* outside its upper and lower end. The two luffing cylinders 5*a*, 5*b* act upon the basic box 4*a* approximately in the centre of an upper half of the basic box 4*a*. In a preferred manner, provision is made that the two luffing cylinders 5*a*, 5*b* act upon the basic box 4*a* of the jib 4 in a region which, as seen in the longitudinal direction of the basic box 4*a*, is spaced apart at least 10%, preferably at least 20%, particularly preferably at least 30%, of the total length of the basic box 4*a* in each case from the upper end and also the lower end of the basic box 4*a*.

Figure 2A:
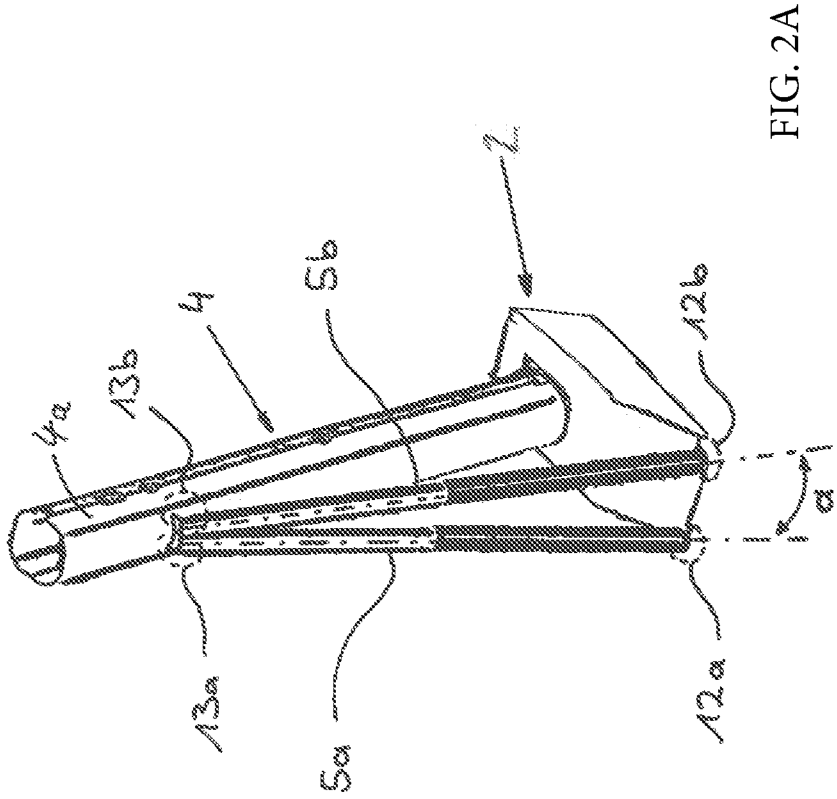
FIG. 2A shows the assembly of FIG. 2 in an alternative embodiment in a schematic illustration.

Basically, it is possible for the base frame 11 shown here to be part of the superstructure 3 of the vehicle crane 1 of FIG. 1 which can be rotated with respect to the lower carriage 2, or else for it to be the superstructure 3 itself. As an alternative thereto, it is feasible for said base frame 11 to be part of the lower carriage 2 of the vehicle crane 1 of FIG. 1, or else for it to be the lower carriage 2 itself, as shown in FIG. 2A.

Figure 3:
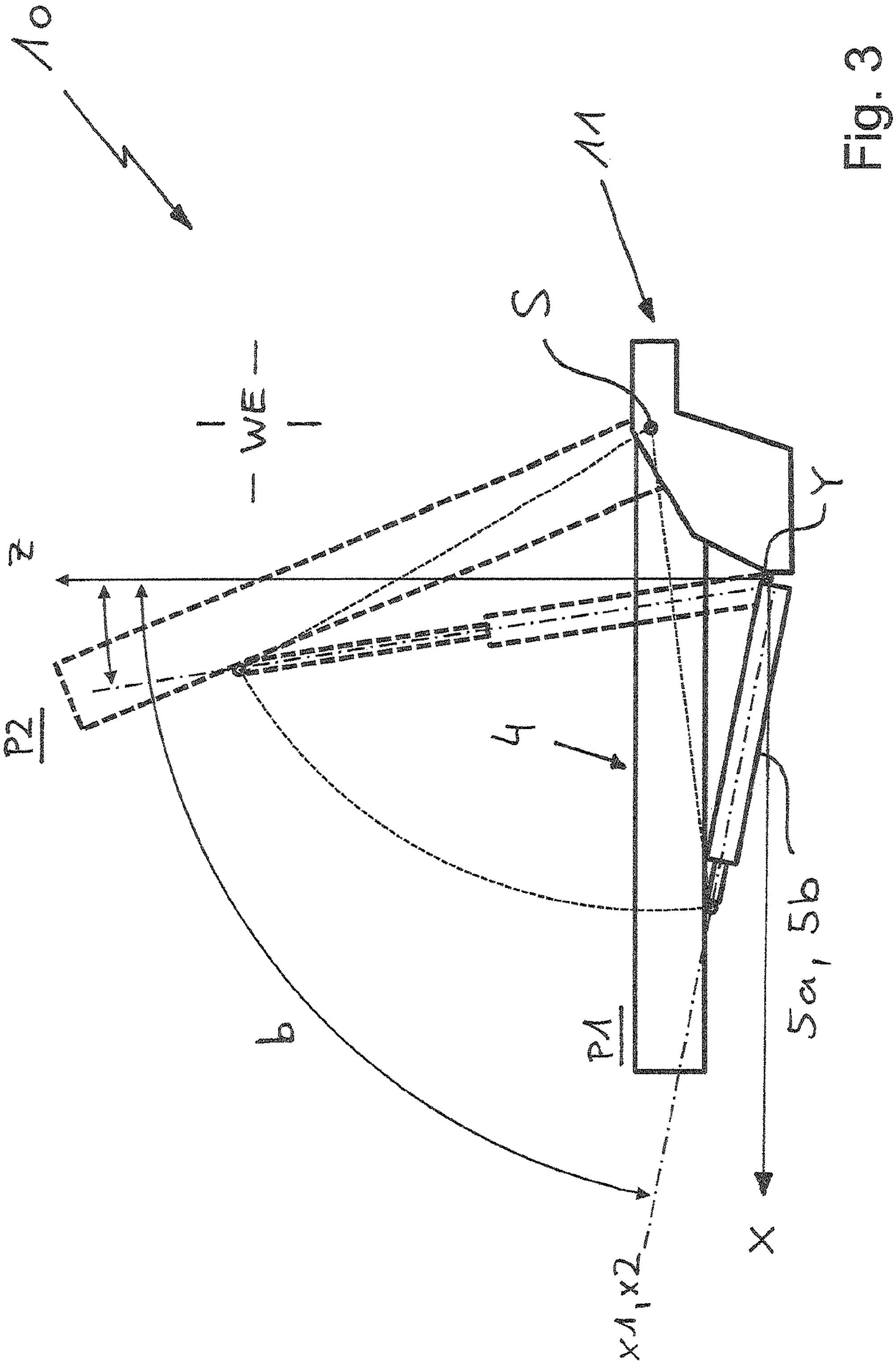
FIG. 3 shows the assembly of FIG. 2 in an alternative embodiment in a schematic illustration of its elevation.

FIG. 3 shows the assembly 10 of FIG. 2 in a now lateral view. In the present case, the horizontal storage position P1 of the jib 4—which for reasons of clarity is also reduced in this case to its basic box—is shown, while its operating position P2 is indicated by broken lines. The jib 4 extends it its storage position P1 e.g. in parallel with a horizontal direction X, while the two luffing cylinders 5*a*, 5*b* which lie opposite one another on the luffing plane WE and are spaced apart from one another in a transverse direction Y lie one on top of the other in this view. Therefore, it is possible to see only the luffing cylinder 5*b* which is in the foreground, while the luffing cylinder 5*a* located therebehind is concealed thereby. The inclination of the luffing cylinders 5*a*, 5*b* which is changed when the jib 4 is in the operating position P2 is likewise indicated accordingly through the use of broken lines.

As can be seen, the longitudinal axis x1, x2 of the luffing cylinders 5*a*, 5*b* which is projected onto the luffing plane WE and an upwards direction Z which extends within the luffing plane WE orthogonally with respect to the horizontal direction X form an angle of inclination b therebetween once the jib 4 is located in its storage positions P1. In other words, when the jib 4 is in the storage position P1 the two luffing cylinders 5*a*, 5*b* are inclined with respect to the upwards direction Z. In the present case, when the jib 4 is in the storage position P1 said angle of inclination b is ca. 75°. Depending upon the configuration of the assembly 10, when the jib 4 is in the storage position P1 the angle of inclination b can also be so large that the luffing cylinders 5*a*, 5*b* can extend, in a manner not shown here, preferably also in parallel to below the horizontal direction X.

Figure 4:
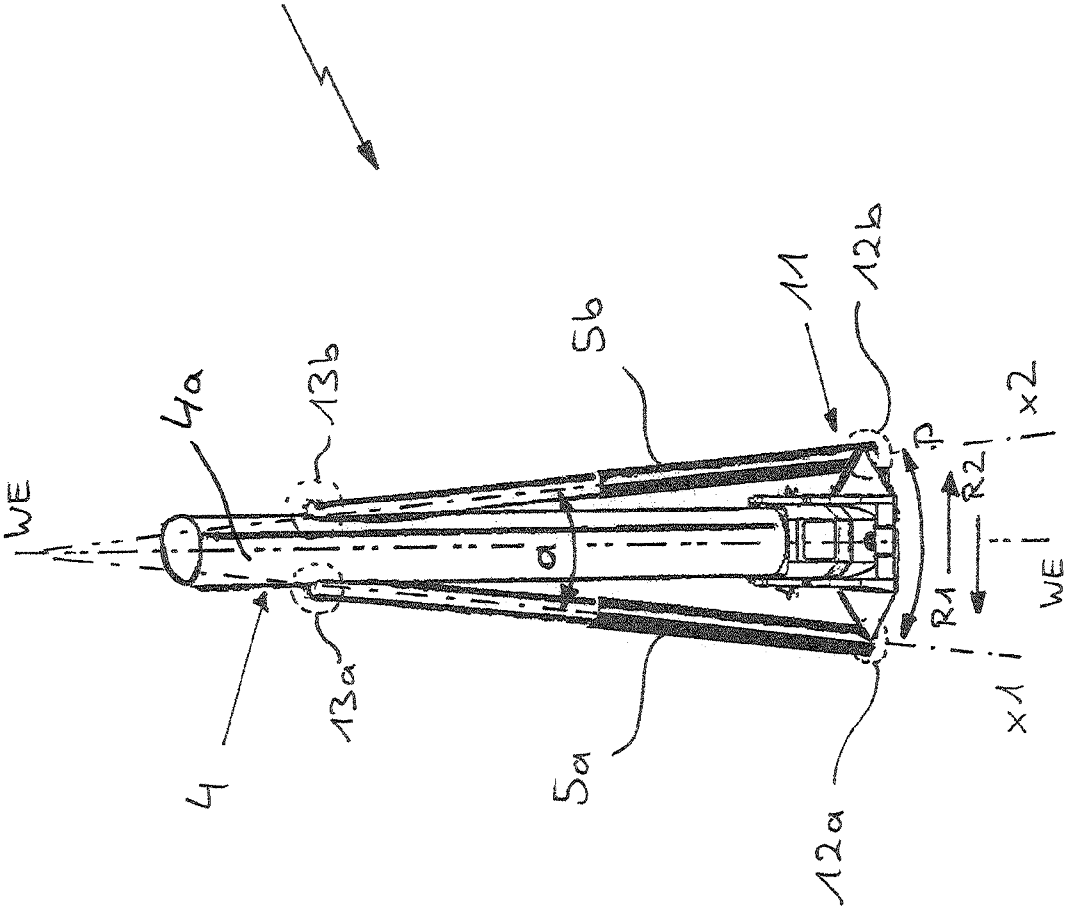
FIG. 4 schematically shows a vehicle crane in accordance with the invention in a frontal view in a first embodiment.

FIG. 4 illustrates the structure of the assembly 10 of FIGS. 2 and 3 with reference to an alternative embodiment. As can be seen in the view of the assembly 10 shown here, the upper mounting assemblies 13*a*, 13*b* of the two luffing cylinders 5*a*, 5*b* can, of course, also be arranged laterally on the basic box of the jib 4. In the present case, the two lower mounting assemblies 12*a*, 12*b* can be displaced, in a manner not shown in greater detail, along a path P extending perpendicularly to the luffing plane WE. The path can have a linear and/or curved course at least in sections, wherein in the present case said course is indicated by way of example as curved. Provision is made that the two mounting assemblies 12*a*, 12*b* can be displaced simultaneously along the path P in respectively opposite directions R1, R2 towards one another or away from one another. By reason of the displaceable design of the mounting assemblies 12*a*, 12*b*, it is possible to change the angle of spread a formed between the longitudinal axes x1, x2 of the two luffing cylinders 5*a*, 5*b*. The change in the angle of spread a which is open at the bottom or towards the base frame 11 can be effected when the jib 4 is in the storage position P1 and/or the operating position P2. The angle of spread a can assume values of greater than 0° to 45°, wherein said angle can preferably be greater when the jib 4 is in the operating position P2 than when it is in the storage position P1. For instance, when the jib 4 is in the storage position P1 the angle of spread a can be e.g. from 0° to 6° so that the two luffing cylinders 5*a*, 5*b* extend almost in parallel with one another in order to obtain e.g. the most compact possible dimensions during travel of the vehicle 1 equipped in this manner.

Figure 5:
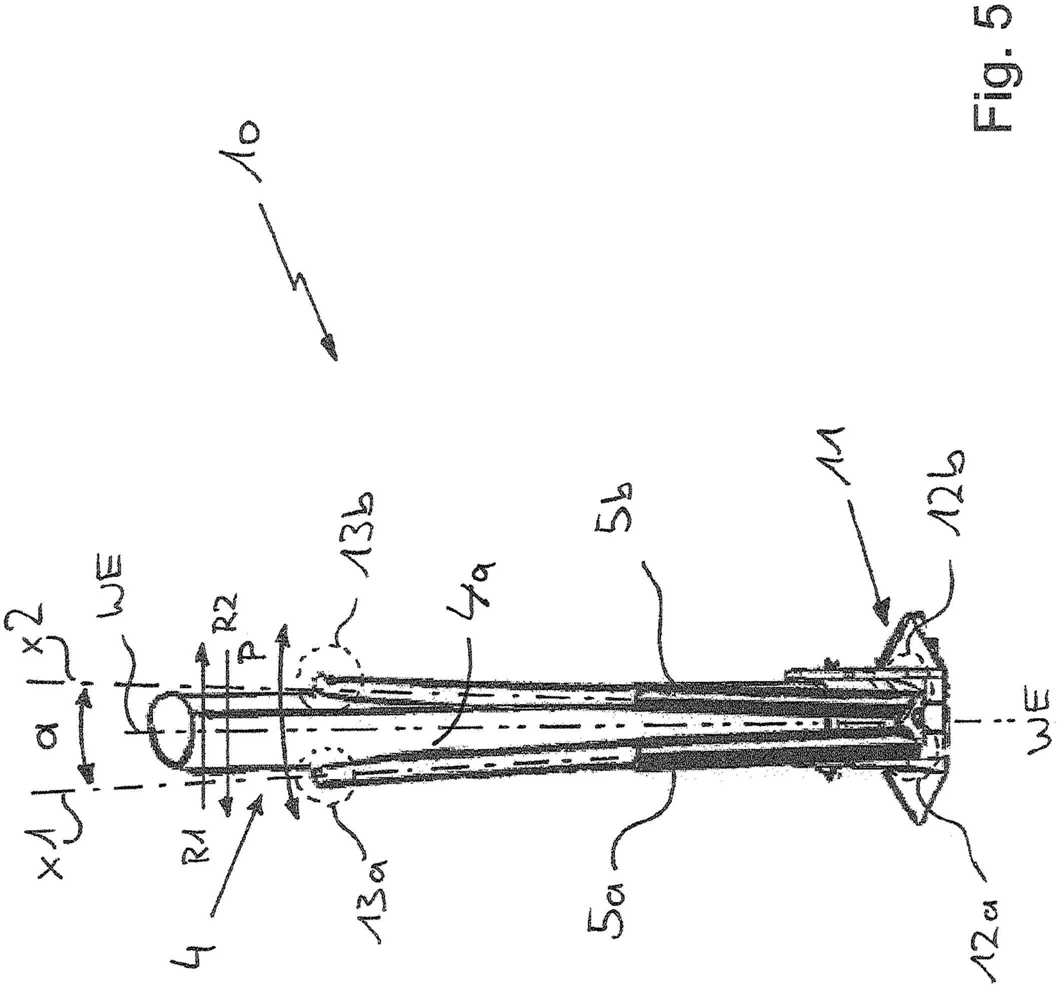
FIG. 5 schematically shows a vehicle crane in accordance with the invention in a frontal view in a further embodiment.

FIG. 5 illustrates a further alternative embodiment of the assembly 10 in accordance with the invention. It can be seen therein that the lower mounting assemblies 12*a*, 12*b* are located opposite the upper mounting assemblies 13*a*, 13*b* such that the angle of spread a formed between the two luffing cylinders 5*a*, 5*b* is now open at the top. In other words, the arrangement of the two luffing cylinders 5*a*, 5*b* tapers in this respect towards the base frame 11. In this case, the respective position of the upper mounting assemblies 13*a*, 13*b* can likewise be changed along a path P, resulting in a corresponding variability in the angle of spread a which is open at the top.

Of course, it is feasible that the upper and lower mounting assemblies 12*a*, 12*b*; 13*a*, 13*b* can be displaced such that the angle of spread a can be opened at the top or at the bottom as required.

Figure 6:
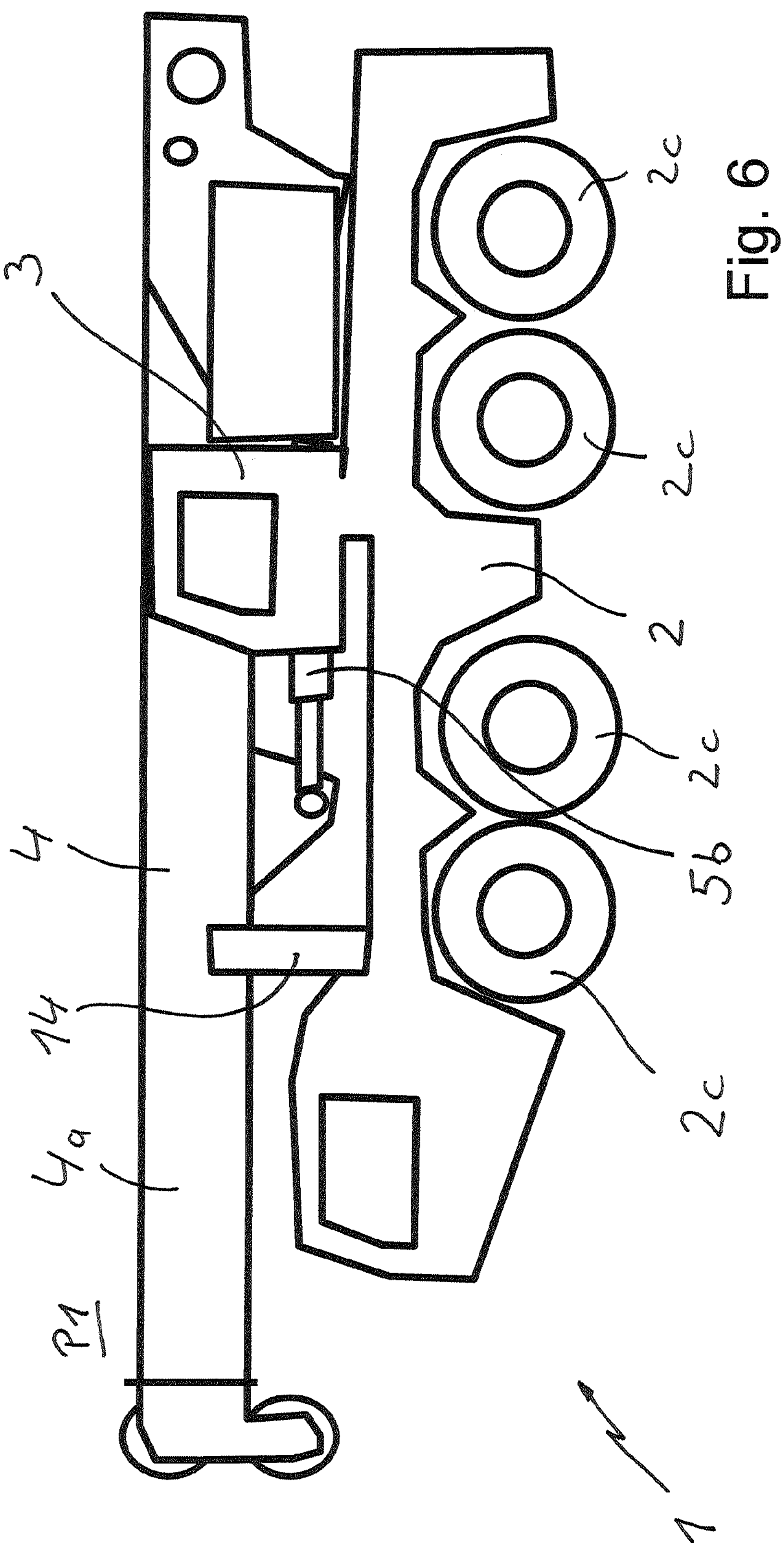
FIG. 6 schematically shows a vehicle crane in accordance with the invention in a design as a mobile crane.

FIG. 6 shows the schematic view of a vehicle crane 1 in accordance with the invention in a design as a mobile crane which can travel on public roads and which correspondingly has a lower carriage 2 with rubber wheel tyres 2*c* distributed to e.g. four axles. In a typical manner, a superstructure 3 which can be pivoted about a vertical axis of rotation and has the luffable jib 4 is mounted on the lower carriage 2. It can be seen that, when the jib 4 is in the substantially horizontal storage position P1 already described with respect to FIG. 3, the jib is supported on the lower carriage 2 via a support 14. For this purpose, the support 14 extends starting from a top side of the lower carriage 2 vertically towards the bottom side of a basic box 4*a* of the jib 4 and abuts against it at this location.

The invention claimed is:

1. A vehicle crane comprising:

a jib and precisely two luffing cylinders, wherein the jib is configured to be luffed via the two luffing cylinders within a vertical luffing plane between a storage position and an operating position;

wherein the luffing cylinders lie opposite one another on the luffing plane and in the operating position form an angle of spread between longitudinal axes of the luffing cylinders, and wherein the luffing cylinders act upon the jib away from ends of the jib;

wherein, when the jib is in the storage position, the longitudinal axis of a luffing cylinder projected onto the luffing plane and an upwards direction extending within the luffing plane form an angle of inclination therebetween;

wherein the angle of inclination is from 80° to 100° when the jib is in the storage position and the angle of spread is from 2° to 30° when the jib is in the operating position;

wherein the jib is a telescoping jib having a basic box and inner boxes that can telescope in and out;

wherein the luffing cylinders act upon the basic box of the jib; and wherein the luffing cylinders act upon a region on the basic box which, as seen in the longitudinal direction of the basic box, is spaced apart at least 10% of the total length of the basic box in each case from an upper end and also a lower end of the basic box.

2. The vehicle crane as claimed in claim 1, wherein the jib is luffably mounted on a base frame, and wherein the base frame has lower mounting assemblies that are each designed as a universal joint or ball joint and via which the luffing cylinders are supported in an articulated manner on the base frame.

3. The vehicle crane as claimed in claim 2, wherein the jib has upper mounting assemblies that are each designed as a universal joint or ball joint and via which the luffing cylinders are supported in an articulated manner on the base frame.

4. The vehicle crane as claimed in claim 3, wherein at least one of the upper and lower mounting assemblies is configured to be variably positioned along a path extending perpendicularly to the luffing plane, and wherein the path has a linear or curved course at least in sections.

5. The vehicle crane as claimed in claim 3, wherein the base frame is part of a superstructure of the vehicle crane which can be rotated with respect to a lower carriage, or is the superstructure itself.

6. The vehicle crane as claimed in claim 3, wherein the base frame is part of a lower carriage of the vehicle crane or is the lower carriage itself.

7. The vehicle crane as claimed in claim 4, wherein the upper and/or lower mounting assemblies can be displaced simultaneously in respectively opposite directions towards one another or away from one another along the path.

8. The vehicle crane as claimed in claim 1, wherein the angle of spread between the longitudinal axes of the two luffing cylinders can be varied when the jib is in the storage position and/or the operating position.

9. The vehicle crane as claimed in claim 8, wherein in the storage position the angle of spread is from 0° to 45°.

10. The vehicle crane as claimed in claim 9, wherein in the storage position the angle of spread is from 0° to 6°.

11. The vehicle crane as claimed in claim 1, wherein the luffing cylinders act upon the region on the basic box which, as seen in the longitudinal direction of the basic box, is spaced apart at least 20% of the total length of the basic box in each case from an upper end and also a lower end of the basic box.

12. The vehicle crane as claimed in claim 11, wherein the luffing cylinders act upon the region on the basic box, which as seen in the longitudinal direction of the basic box, is spaced apart at least 30% of the total length of the basic box in each case from an upper end and also a lower end of the basic box.

13. The vehicle crane as claimed in claim 1, wherein the vehicle crane comprises a lower carriage.

14. The vehicle crane as claimed in claim 13, wherein when the jib is in the storage position the jib is supported on the lower carriage.

15. The vehicle crane of claim 1, wherein the angle of inclination is from 90° to 97° when the jib is in the storage position.

* * * * *